United States Patent [19]
Beckman

[11] Patent Number: 4,472,759
[45] Date of Patent: Sep. 18, 1984

[54] AIR TRIMMER CAPACITOR

[75] Inventor: John B. Beckman, Cedartown, Ga.

[73] Assignee: Murata Eria North America, Inc., Marietta, Ga.

[21] Appl. No.: 530,500

[22] Filed: Sep. 9, 1983

[51] Int. Cl.³ .............................................. H01G 5/22
[52] U.S. Cl. ............................................... 361/295
[58] Field of Search ............... 361/277, 287, 292, 295

[56] References Cited

U.S. PATENT DOCUMENTS

| | | | |
|---|---|---|---|
| 2,747,147 | 5/1956 | Shull | 361/295 |
| 3,133,260 | 5/1964 | Melanson et al. | 361/277 X |
| 3,230,430 | 1/1966 | Barnes | 361/287 |
| 3,840,786 | 10/1974 | Fried | 361/295 |

*Primary Examiner*—Donald A. Griffin
*Attorney, Agent, or Firm*—Thomas & Kennedy

[57] ABSTRACT

An air trimmer capacitor has a tubular housing having an interior wall formed with angularly spaced flats that are interconnected with conically arcuate wall sections. A coil spring is confined within the housing in contact with the flats. A rotor is threadably received in the coil spring that supports an electrode in adjustably spaced relation with a stationary electrode.

9 Claims, 2 Drawing Figures

AIR TRIMMER CAPACITOR

TECHNICAL FIELD

This invention relates to air trimmer capacitors of the type having an electrode supported upon a rotor for positional adjustment with respect to a stationary electrode.

BACKGROUND OF THE INVENTION

Air trimmer capacitors are often subjected to thermal cycling and mechanical vibration which can alter the spacing of the capacitor plates, or electrodes as the plates are referred to herein, thereby altering the capacitance of the device itself. To inhibit this from occuring such capacitors have been constructed with a helically threaded engagement between a rotor, that carries a movable electrode, and the capacitor housing which supports or functions as a stationary electrode. The movable electrode is electrically connected with a device terminal through the rotor, and the threads between the rotor and a section of the housing. Since helical threads inherently provide rather poor electrical contacts it has been a common practice to distort the rotor threads so as to produce an engagement mismatch between those of the rotor and housing in order to improve the mechanical contact and electrical coupling therebetween. Such thread distortion also helps to increase the friction or torque between the rotor and housing to minimize frequency drift attributable to vibration-induced migration of the rotor.

Ultra-high frequency circuits are typically quite sensitive to changes in current path geometries. Consequently, threads distorted in air trimmer capacitors provide a current path that may be varied, depending upon the position of the thread distortion with respect to the rotor terminal. When the capacitor is adjusted to provide minimum capacitance, i.e. maximum spacing between electrodes, the thread distortion that provides a current path may be located some distance away from the rotor terminal. Consequently, current path changes occur with tuning which change self-inductance, the Q factor, and the self-resonant frequency. This provides a complication for circuit designers who therefore must treat the capacitor as a variable impedance device. In addition, distorted threads wear at a relatively high rate which produces progressively deteriorating electrical contact and progressively looser rotor fit which renders the device increasingly subject to rotor migration.

In U.S. Pat. No. 4,415,949 which is assigned to the assignee of the present application, an air trimmer capacitor is disclosed which ameliorates these problems by providing a UHF current path which is substantially independent of the position of the movable electrode and rotor, and anti-rotational torque that does not tend to vary as a function of the wear of rotor housing threads. This is accomplished with the provision of a tightly wound coil spring confined within the housing in engagement with rotor threads with adjacent turns of the coil having their centers offset from one another. When the threads of the rotor engage the tightly wound coil spring the eccentric turns of the spring are forced towards relative concentricity because the minor diameter of the rotor threads is greater than the relaxed diameter of the spring. Beyond the threads the spring is brought by a smooth, cylindrical outer surface of the rotor into nearly linear contact with the housing interior wall. Good contact is therefore established all along the wall including that location closest to the rotor terminal whereby the current path is essentially made independent of rotor position and mismatching thread design is avoided.

Though the just-described air trimmer capacitor has provided decided improvements in the art, it has not totally eliminated the previous-described problems. This is at least in part due to the fact that the interior wall of the housing in which the rotor and spring are located is not exactly cylindrical. It rather has a slight conical taper so that it may be die cast rather than machined for economy of manufacture. Were the interior wall to be precisely cylindrical the part could not be easily removed from a die following a casting operation since a void would tend to be created occupied by a partial vacuum as part removal were attempted. Though the conical taper is slight, typically about 1°, it nevertheless is sufficient to provide a looseness of fit and contact between the tightly wound coil spring and the interior wall of the housing, even though the adjacent coils of the spring are eccentric. Conceivably it would be possible to overcome this problem by the use of an eccentric spring that itself had an overall conical taper. However, the cost of manufacturing such a spring in a reliably repeatable manner renders such an approach not feasible. Accordingly, it is to the provision of an alternate solution to such problem that the present invention is primarily directed.

SUMMARY OF THE INVENTION

In one form of the invention a variable air trimmer capacitor comprises a tubular housing having a first section that includes a stationary electrode and a second section electrically insulated from the first section. The second housing section has an interior wall formed by at least three angularly spaced flats. A coil spring is confined in the housing second section in contact with the wall flats. A rotor is threadably received in the coil spring which supports a rotor electrode in adjustably spaced relation with the stationary electrode.

In another form of the invention a variable air trimmer capacitor comprises a tubular housing having a first section that includes a stationary electrode and a second section electrically insulated from the first section having a bore-defining wall formed with at least three angularly-spaced flats that are interconnected with conically arcuate wall sections. A coil spring is confined in the housing second section bore in contact with the barrel flats. A rotor is threadably received in the coil spring that supports a movable electrode within the housing first section in spaced relation with the stationary electrode.

DETAILED DESCRIPTION

Figure 1:
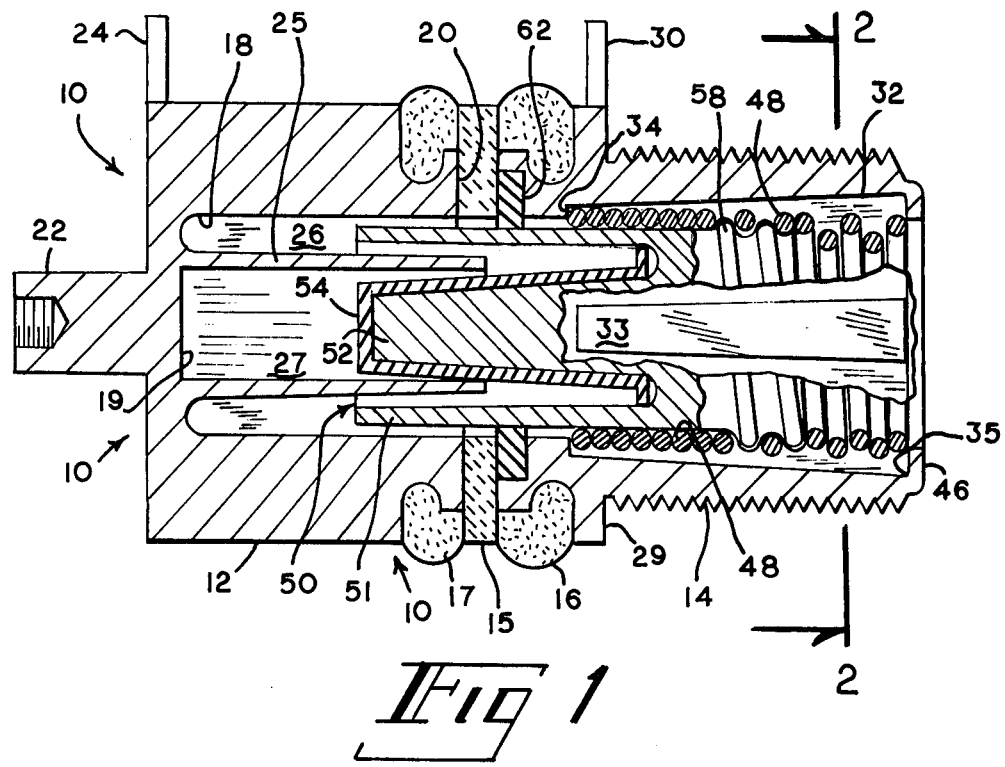
FIG. 1 is a cross-sectional view of an air trimmer capacitor embodying principles of the present invention.

Referring now in more detail to the drawing, there is shown an air trimmer capacitor 10 having a tubular housing which includes a stator section 12 and a bushing section 14, both of which are formed of a conductive material such as copper and which are joined together with a nonconductive, ceramic spacer 15 sandwiched therebetween. The stator, spacer and bushing are all adhered together by annular epoxy beads 16 and 17. The stator 12 has a cylindrical recess partially formed by a side wall 18 and an end wall 19 opposite an open end 20. The stator also has a turret 22 adjacent the end wall 19 and a stator terminal 24. An annular shell 25 extends from the end wall 19 towards the open end 20 which shell is concentric with the side wall 18. The side wall 18 and shell 25 collectively define an annular space 26 while the shell alone defines a central space 27. These spaces provide an air dielectric between surfaces of the stator and a rotor. The bushing section 14 of the housing 10 has exterior threads by which the capacitor may be secured to a circuit board with an annular shoulder 29 seated upon the board. A bushing or rotor terminal 30 is provided along this shoulder for electrical connection to the circuit in which the device is to be employed. The bushing 14 has an internal wall or barrel 32 of generally cylindrical shape but which has a slight taper, such as in the order of 1°, so as actually to be of a generally conical shape along spaced, arcuate portions thereof, rather than purely cylindrical. This taper is provided to enable the bushing to be easily withdrawn from a die during its manufacture following a die casting operation. The wall or barrel, however, is not truly conical either, in that it has three angularly spaced, planar flats 33 that extend from a shoulder 34 located near the bead 16 and another shoulder 35 formed by a swaged annular lip 46 at the end of the bushing distal the stator section 12. As these flats have planar surfaces and are formed unitarily and coextensively with the conical portions of the interior wall, the flats are trapezoidal, as shown in FIG. 1. Though the arcuate portions of the barrel are tapered, the flats are not but rather remain at the same distance from the barrel axis from one flat end to the other.

The interior wall or barrel of the bushing section houses a tightly wound coil spring 48 whose adjacent turns are of the same diameter but have eccentric centers. The spring is confined within the barrel between the shoulders 34 and 35. Rotatably confined within the barrel of the housing bushing section 14 is a rotor 50 which has an annular shell 51 that has a diameter smaller than the diameter of the stator wall 18 but a diameter larger than the diameter of the annular stator shell 25. The rotor shell 51 is made of conductive material similar to the stator shell 25 and serves as part of the movable electrode of the trimmer capacitor. The stator also has a rod portion 52 that has a diameter smaller than that of the stator shell 25 about which a Teflon sleeve 54 is fitted. The Teflon sleeve also acts as a dielectric between the stationary and movable electrodes.

The rotor 50 is further seen to be formed with exterior, helical threads 58 which are sized to receive the turns of the tightly wound coil spring 48. An unshown slot is formed in the end of the rotor adjacent the threads to receive a screwdriver inserted into the barrel through the spring in order to turn the rotor to alter the capacitance of the device. The rotor threads are molded with a minor diameter slightly greater than the diameter of the coils of the spring so that when the rotor is rotated the threads firmly engage the spring coils and force them radially outward. Finally, an annular, rubber washer 62 is confined within the bushing section in frictional engagement with the rotor.

Figure 2:
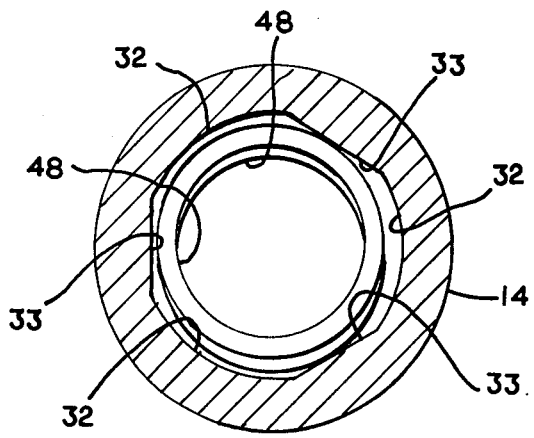
FIG. 2 is a transverse, cross-sectional view of the capacitor shown in FIG. 1 taken along plane 2—2.

The radially outward force imparted to the turns of the coil spring by the rotor threads forces the engaged turns of the spring towards mutual concentricity. In this manner contact between the coils of the spring and the rotor threads provides frictional resistance to rotation of the rotor in the barrel and simultaneously provide electrical contact between the rotor and spring. The spring, being tightly wound, confined within the barrel and biased outwardly into engagement with the barrel wall, exerts a constantly outward force against the wall flats 33 thereby providing a current contact at every point where the spring contacts the flats. Thus, there is provided additional resistance to migration of the rotor. Through the spring does engage the flats all along the length of the barrel it will be appreciated that the current path between rotor and terminal 30 is essentially through those turns of the coil closest to the terminal that are in contact with the barrel flats. It appears in FIG. 1 that turns of the coil spring 48 located distal the stator 12 are not in contact with the barrel wall. In actuality, however, they are in contact all along the length of the barrel wall with the flats as shown in FIG. 2. Though such is of little import from an electrical flow path point of view, since some of the coils are at a substantial distance from terminal 30 and some are even located beyond the rotor, such does provide mechanical stability to the spring from one end to the other. Furthermore, this is accomplished without having to have the spring constructed with an overall conical shape.

In operation the terminals 24 and 30 are connected in a circuit for operation at radio frequencies whereupon the device serves as a capacitor by virtue of the spacing between the movable electrode provided by the rotor and the stationary electrode provided by the stator. For tuning or trimming, the rotor is rotated as with a screwdriver which causes it not only to rotate but also to move axially within the device housing in threaded engagement with the turns of the tightly wound coil spring. As this is done, good electrical contact is maintained between the rotor, spring and barrel in the vicinity of the terminal 30. This insures that the current flow path remains approximately radially between the rotor and the terminal through the turns of the coil adjacent shoulder 34 regardless of the rotor position. Also, the turns of the coil located distal the stator remain in firm engagement with the barrel to insure that mechanical stability is maintained and to inhibit migration of the rotor caused by vibration or shock imparted to the device. All of this is achieved even though the barrel does possess a taper.

It should be understood that the just-described embodiment merely illustrates principles of the invention in one preferred form. Many modifications, additions and deletions may, of course, be made thereto without departure from the spirit and scope of the invention as set forth in the following claims.

I claim:

1. A variable air trimmer capacitor comprising a tubular housing having a first section that includes a stationary electrode and a second section electrically insulated from said first section that has an interior tubular wall formed by at least three angularly spaced flats; a coil spring confined within said housing second section in contact with said wall flats; and a rotor threadably received in said coil spring supporting a movable electrode in adjustably spaced relation with said stationary electrode.

2. The variable air trimmer capacitor of claim 1 wherein said coil spring is tightly wound.

3. The variable air trimmer capacitor of claim 1 wherein said coil spring has a plurality of eccentric turns.

4. The variable air trimmer capacitor of claim 1 wherein said rotor has an externally threaded section from which a cylindrical section extends.

5. The variable air trimmer capacitor of claim 1 wherein said flats are interconnected by conically arcuate portions of said tubular wall.

6. The variable air trimmer capacitor of claim 5 wherein said coil spring is tightly wound.

7. The variable air trimmer capacitor of claim 5 wherein said coil spring has a plurality of eccentric turns.

8. The variable air trimmer capacitor of claim 5 wherein said rotor has an externally threaded section from which a cylindrical section extends.

9. A variable air trimmer capacitor comprising a tubular housing having a first section that includes a stationary electrode and a second section electrically insulated from said first section having a bore-defining wall formed with at least three angularly-spaced flats interconnected with conically arcuate wall sections, a coil spring confined in said housing second section bore in contact with said barrel flats, and a rotor threadably received in said coil spring that supports a movable electrode within said housing first section in spaced relation with said stationary electrode.

* * * * *